United States Patent
Baldino et al.

(10) Patent No.: US 9,204,096 B2
(45) Date of Patent: *Dec. 1, 2015

(54) SYSTEM AND METHOD FOR EXTENDING COMMUNICATIONS BETWEEN PARTICIPANTS IN A CONFERENCING ENVIRONMENT

(71) Applicant: CISCO TECHNOLOGY, INC., San Jose, CA (US)

(72) Inventors: Brian J. Baldino, Milpitas, CA (US); Michael G. Rexroad, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,608

(22) Filed: Jan. 14, 2014

(65) Prior Publication Data
US 2014/0125758 A1 May 8, 2014

Related U.S. Application Data

(63) Continuation of application No. 12/475,075, filed on May 29, 2009, now Pat. No. 8,659,639.

(51) Int. Cl.
*H04N 7/15* (2006.01)
*G06Q 10/10* (2012.01)
(Continued)

(52) U.S. Cl.
CPC .............. *H04N 7/15* (2013.01); *G06Q 10/10* (2013.01); *H04N 21/4223* (2013.01); *H04N 21/42203* (2013.01); *H04N 21/4788* (2013.01)

(58) Field of Classification Search
CPC ................................ H04N 7/15; H04N 7/152
USPC ........................................ 348/14.08, 14.09
See application file for complete search history.

(56) References Cited

U.S. PATENT DOCUMENTS 2,911,462 A 11/1959 Brady
3,793,489 A 2/1974 Sank
(Continued)

FOREIGN PATENT DOCUMENTS

CN 101383925 A 3/2009
CN 101953158 A 1/2011
(Continued)

OTHER PUBLICATIONS

"3D Particles Experiments in AS3 and Flash CS3," [retrieved and printed on Mar. 18, 2010]; 2 pages; http://www.flashandmath.com/advanced/fourparticles/notes.html.
(Continued)

*Primary Examiner* — Stella L Woo
(74) *Attorney, Agent, or Firm* — Patent Capital Group

(57) ABSTRACT

A method is provided in one example embodiment and includes receiving data associated with a local endpoint that is configured to participate in a video conference. The local endpoint can be configured to detect a signal generated by a local end user device and to relay the signal to a local manager element. The method also includes transmitting the signal over a network to a remote manager element at a remote location. In more specific embodiments, the method includes receiving an additional signal from the remote manager element, and determining a selected local endpoint to receive the additional signal from the remote manager element.

12 Claims, 4 Drawing Sheets

(51) Int. Cl.
   *H04N 21/422*     (2011.01)
   *H04N 21/4223*    (2011.01)
   *H04N 21/4788*    (2011.01)

(56) References Cited

U.S. PATENT DOCUMENTS

| | | | |
|---|---|---|---|
| 3,909,121 A | 9/1975 | De Mesquita Cardoso |
| 4,400,724 A | 8/1983 | Fields |
| 4,473,285 A | 9/1984 | Winter |
| 4,494,144 A | 1/1985 | Brown |
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,490,208 A | 2/1996 | Remillard |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| 5,920,693 A | 7/1999 | Burkman et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,344,874 B1 | 2/2002 | Helms et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,614,781 B1 | 9/2003 | Elliott et al. |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,801,637 B2 | 10/2004 | Voronka et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,053,923 B1 | 5/2006 | Hamilton |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |

(56) References Cited

U.S. PATENT DOCUMENTS

| | | |
|---|---|---|
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,607,101 B1 | 10/2009 | Barrus |
| 7,616,226 B2 | 11/2009 | Roessler et al. |
| 7,623,115 B2 | 11/2009 | Marks |
| 7,624,417 B2 | 11/2009 | Dua |
| 7,646,419 B2 | 1/2010 | Cernasov |
| D610,560 S | 2/2010 | Chen |
| 7,675,537 B2 * | 3/2010 | Wilson et al. ............. 348/14.01 |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| 7,738,457 B2 | 6/2010 | Nordmark et al. |
| D626,102 S | 10/2010 | Buzzard et al. |
| D626,103 S | 10/2010 | Buzzard et al. |
| 7,813,724 B2 | 10/2010 | Gronner et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,886,048 B1 | 2/2011 | Holland et al. |
| 7,889,851 B2 | 2/2011 | Shah et al. |
| 7,894,531 B1 | 2/2011 | Cetin et al. |
| 7,899,265 B1 | 3/2011 | Rostami |
| 7,920,158 B1 | 4/2011 | Beck et al. |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| 8,289,363 B2 | 10/2012 | Buckler |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 8,542,264 B2 | 9/2013 | Lu et al. |
| 8,588,758 B2 | 11/2013 | Ullrich |
| 8,614,735 B2 | 12/2013 | Buckler |
| 8,659,637 B2 | 2/2014 | De Beer et al. |
| 8,659,639 B2 * | 2/2014 | Baldino et al. ............. 348/14.09 |
| 8,670,019 B2 | 3/2014 | Byers |
| 8,692,862 B2 | 4/2014 | N'Guessan |
| 8,699,457 B2 | 4/2014 | Venkataswami et al. |
| 8,723,914 B2 | 5/2014 | Mackie et al. |
| 8,730,297 B2 | 5/2014 | Fornell et al. |
| 8,786,631 B1 | 7/2014 | Collins |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0221243 A1 | 11/2004 | Twerdahl et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0071430 A1 * | 3/2005 | Kobayashi et al. ........... 709/205 |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |

(56) References Cited

U.S. PATENT DOCUMENTS

| | | |
|---|---|---|
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0184497 A1* | 8/2006 | Suzuki et al. .................. 707/1 |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navali et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0257983 A1 | 11/2007 | Miali |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0283380 A1 | 12/2007 | Aoki et al. |
| 2007/0285505 A1 | 12/2007 | Korneliussen |
| 2007/0291667 A1 | 12/2007 | Huber et al. |
| 2008/0043041 A2 | 2/2008 | Hedenstroem et al. |
| 2008/0044064 A1 | 2/2008 | His |
| 2008/0046840 A1 | 2/2008 | Melton et al. |
| 2008/0068446 A1 | 3/2008 | Barkley et al. |
| 2008/0069444 A1 | 3/2008 | Wilensky |
| 2008/0077390 A1 | 3/2008 | Nagao |
| 2008/0077883 A1 | 3/2008 | Kim et al. |
| 2008/0084429 A1 | 4/2008 | Wissinger |
| 2008/0119211 A1 | 5/2008 | Paas et al. |
| 2008/0134098 A1 | 6/2008 | Hoglund et al. |
| 2008/0136896 A1 | 6/2008 | Graham et al. |
| 2008/0148187 A1 | 6/2008 | Miyata et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2008/0307218 A1 | 12/2008 | Logvinov |
| 2009/0003723 A1 | 1/2009 | Kokemohr |
| 2009/0009593 A1 | 1/2009 | Cameron et al. |
| 2009/0051756 A1 | 2/2009 | Trachtenberg |
| 2009/0079812 A1 | 3/2009 | Crenshaw et al. |
| 2009/0096573 A1 | 4/2009 | Graessley |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0147070 A1 | 6/2009 | Marathe et al. |
| 2009/0174764 A1 | 7/2009 | Chadha et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0322082 A1 | 12/2009 | Wagoner |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0042281 A1 | 2/2010 | Filla |
| 2010/0082557 A1 | 4/2010 | Gao et al. |
| 2010/0123770 A1 | 5/2010 | Friel et al. |
| 2010/0149306 A1* | 6/2010 | Gopal et al. ............... 348/14.09 |
| 2010/0153853 A1 | 6/2010 | Dawes et al. |
| 2010/0158387 A1 | 6/2010 | Choi et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2011/0037636 A1 | 2/2011 | Alexander |
| 2012/0026278 A1 | 2/2012 | Goodman et al. |
| 2012/0038742 A1 | 2/2012 | Robinson et al. |
| 2012/0050456 A1 | 3/2012 | Arnao et al. |
| 2012/0050458 A1 | 3/2012 | Mauchly et al. |
| 2012/0057636 A1 | 3/2012 | Tian et al. |
| 2012/0092439 A1 | 4/2012 | Mackie et al. |
| 2012/0092441 A1 | 4/2012 | Kong et al. |
| 2012/0092444 A1 | 4/2012 | Mackie et al. |
| 2012/0099538 A1 | 4/2012 | Venkataswami et al. |
| 2012/0106428 A1 | 5/2012 | Schlicht et al. |
| 2012/0106507 A1 | 5/2012 | Venkataswami et al. |
| 2012/0120085 A1 | 5/2012 | Kanalakis, Jr. et al. |
| 2012/0120181 A1 | 5/2012 | Kanalakis, Jr. et al. |
| 2012/0120184 A1 | 5/2012 | Fornell et al. |
| 2012/0120270 A1 | 5/2012 | Li et al. |
| 2012/0127259 A1 | 5/2012 | Mackie et al. |
| 2012/0133580 A1 | 5/2012 | Kirby et al. |
| 2012/0143605 A1 | 6/2012 | Thorsen et al. |
| 2012/0169838 A1 | 7/2012 | Sekine |
| 2012/0218373 A1 | 8/2012 | N'guessan |

(56) References Cited

U.S. PATENT DOCUMENTS

| | | |
|---|---|---|
| 2012/0226997 A1 | 9/2012 | Pang |
| 2012/0266082 A1 | 10/2012 | Webber |
| 2012/0274735 A1 | 11/2012 | Byers |
| 2012/0297342 A1 | 11/2012 | Jang et al. |
| 2012/0327173 A1 | 12/2012 | Couse et al. |
| 2013/0088565 A1 | 4/2013 | Buckler |
| 2013/0120522 A1 | 5/2013 | Lian et al. |

FOREIGN PATENT DOCUMENTS

| | | |
|---|---|---|
| CN | 102067593 | 5/2011 |
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 22777308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO2007/106157 | 9/2007 |
| WO | WO2007/123946 | 11/2007 |
| WO | WO 2007/123960 | 11/2007 |
| WO | WO 2007/123960 A2 | 11/2007 |
| WO | WO2008/039371 | 4/2008 |
| WO | WO 2008/101117 A1 | 8/2008 |
| WO | WO 2008/118887 A2 | 10/2008 |
| WO | WO 2009/102503 A2 | 8/2009 |
| WO | WO 2009/120814 A2 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

3G, "World's First 3G Video Conference Service with New TV Commercial," Apr. 28, 2005, 4 pages; http://www.3g.co.uk/PR/April2005/1383.htm.

"Cisco Expo Germany 2009 Opening," Posted on YouTube on May 4, 2009; http://www.youtube.com/watch?v=SDKsaSlz4MK; 2 pages.

"Eye Tracking," from Wikipedia, (printed on Aug. 31, 2011) 12 pages; http://en.wikipedia.org/wiki/Eye_tracker.

"Infrared Cameras TVS-200-EX," [retrieved and printed on May 24, 2010] http://www.electrophysics.com/Browse/Brw_ProductLineCategory.asp?CategoryID=184&Area=IS; 2 pages.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Active8-3D—Holographic Projection—3D Hologram Retail Display & Video Project, [retrieved and printed on Feb. 24, 2009], http://www.activ8-3d.co.uk/3d_holocubes; 1 page.

Andersson, L., et al., "LDP Specification," Network Working Group, RFC 3036, Jan. 2001, 133 pages; http://tools.ietf.org/html/rfc3036.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arrington, Michael, "eJamming—Distributed Jamming," TechCrunch; Mar. 16, 2006; http://www.techcrunch.com/2006/03/16/ejamming-distributed-jamming/; 1 page.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.

Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.

Awduche, D., et al., "Requirements for Traffic Engineering over MPLS," Network Working Group, RFC 2702, Sep. 1999, 30 pages; http://tools.ietf.org/pdf/rfc2702.pdf.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.

Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.

Boros, S., "Policy-Based Network Management with SNMP," Proceedings of the EUNICE 2000 Summer School Sep. 13-15, 2000, p. 3.

Chan, Eric, et al., "Experiments on block-matching techniques for video coding," Multimedia Systems; 9 Springer-Verlag 1994, Multimedia Systems (1994) 2 pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.

(56) References Cited

OTHER PUBLICATIONS

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Chien et al., "Efficient moving Object Segmentation Algorithm Using Background Registration Technique," IEEE Transactions on Circuits and Systems for Video Technology, vol. 12, No. 7, Jul. 2002, 10 pages.

Cisco: Bill Mauchly and Mod Marathe; UNC: Henry Fuchs, et al., "Depth-Dependent Perspective Rendering," Apr. 15, 2008; 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.

Digital Video Enterprises, "DVE Eye Contact Silhouette," 1 page, © DVE 2008; http://www.dvetelepresence.com/products/eyeContactSilhouette.asp.

Dornaika F., et al., "Head and Facial Animation Tracking Using Appearance-Adaptive Models and Particle Filters," 20040627; 20040627-20040602, Jun. 27, 2004, 22 pages; Heudiasy Research Lab,http://eprints.pascal-network.org/archive/00001231/01/rtvhci_chapter8.pdf.

ECmag.com, "IBS Products," Published Apr. 2009; http://www.ecmag.com/index.cfm?fa=article&articleID=10065; 2 pages.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Gundavelli, S., et al., "Proxy Mobile IPv6," Network Working Group, RFC 5213, Aug. 2008, 93 pages; http://tools.ietf.org/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: A Paradigm for Automatic Real-Time Camera Control and Directing," Proc. SIGGRAPH, Aug. 1996; http://research.microsoft.com/en-us/um/people/lhe/papers/siggraph96.vc.pdf; 8 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, Feb. 2, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

(56) References Cited

OTHER PUBLICATIONS

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation, Dec. 9, 2008; http://www.leadwerks.com/files/Deferred_Rendering_in_Leadwerks_Engine.pdf; 10 pages.

Kollarits, R.V., et al., "34.4: An Eye Contact Camera/Display System for Videophone Applications Using a Conventional Direct-View LCD," Society for Information Display, International Symposium 1996 Digest of Technical Papers, vol. XXVI, May 23, 1995, pp. 765-768; http://citeseerx.ist.psu.edu/viewdoc/download;jsessionid=47A1E7E028C26503975E633895D114EC?doi=10.1.1.42.1772&rep=rep1&type=pdf.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages http://fulfillment.umi.com/dissertations/b7afbcb56ba72fdb14d26dfccc6b470f/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Lawson, S., "Cisco Plans TelePresence Translation Next Year," Dec. 9, 2008; http://www.pcworld.com/article/155237/.html?tk=rss_news; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/Ijy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Minoru from Novo is the worlds first consumer 3D Webcam, Dec. 11, 2008; http://www.minoru3d.com; 4 pages.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of Computer Science, KAIST, Oct. 29, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html; 2 pages.

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

PCT Jun. 29, 2010 PCT International Search Report and the Written Opinion of the International Searching Authority, or the Declaration, PCT/US2010/026456, dated Jun. 29, 2010, 11 pages.

PCT Sep. 18, 2008 PCT International Search Report (4 pages), International Preliminary Report on Patentability (1 page), and Written Opinion of the ISA (7 pages); PCT/US2008/058079; dated Sep. 18, 2008.

PCT Oct. 10, 2009 PCT Notification of Transmittal of the International Search Report and the Written Opinion of the International Searching Authority, or the Declaration; PCT/US2009/038310; dated Oct. 10, 2009; 19 pages.

PCT Apr. 4, 2009 Notification of Transmittal of the International Search Report and the Written Opinion of the International Searching Authority, or the Declaration from PCT/US2009/001070, 17 pages.

PCT May 11, 2010 International Search Report from PCT/US2010/024059; 4 pages.

PCT Oct. 7, 2010 PCT International Preliminary Report on Patentability mailed Oct. 7, 2010 for PCT/US2009/038310; 10 pages.

PCT Feb. 23, 2010 PCT Notification of Transmittal of the International Search Report and the Written Opinion of the International Searching Authority, or the Declaration for PCT/US2009/064061 mailed Feb. 23, 2010; 14 pages.

PCT Aug. 24, 2010 PCT International Search Report mailed Aug. 24, 2010 for PCT/US2010033880; 4 pages.

PCT Aug. 26, 2010 International Preliminary Report on Patentability mailed Aug. 26, 2010 for PCT/US2009/001070; 10 pages.

PCT Oct. 12, 2011 International Search Report and Written Opinion of the ISA from PCT/US2011/050380.

PCT Nov. 24, 2011 International Preliminary Report on Patentability from International Application Serial No. PCT/US2010/033880; 6 pages.

PCT Aug. 23, 2011 International Preliminary Report on Patentability and Written Opinion of the ISA from PCT/US2010/024059; 6 pages.

PCT Sep. 13, 2011 International Preliminary Report on Patentability and the Written Opinion of the ISA from PCT/US2010/026456; 5 pages.

PCT Jan. 23, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

PCT Mar. 21, 2013 International Preliminary Report on Patentability from International Application Serial No. PCT/US2011/050380.

PCT May 30, 2013 International Preliminary Report on Patentability and Written Opinion from the International Searching Authority for International Application Serial No. PCT/US2011/061442 8 pages.

(56) References Cited

OTHER PUBLICATIONS

PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos, G., et a., ""An Image Transform Approach for HMM Based Automatic Lipreading,"" in Proceedings of IEEE International Conference on Image Processing, ICIP, vol. 3, Oct. 7, 1998, 5 pages; http://citeseerx.ist.psu.edu/viewdoc/summary?doi=10.1.1.13.6802.
Radhika, N., et al., "Mobile Dynamic reconfigurable Context aware middleware for Adhoc smart spaces," Academic Open Internet Journal, ISSN 1311-4360, vol. 22, Mar. 3, 2008; 3 pages; http://www.acadjournal.com/2008/V22/part6/p7.
Rayvel Business-to-Business Products, copyright 2004 [retrieved and printed on Feb. 24, 2009], http://www.rayvel.com/b2b.html; 2 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.
Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Tan, Kar-Han, et al., "Appearance-Based Eye Gaze Estimation," In Proceedings of 6th IEEE Workshop on Applications of Computer Vision (WACV 2002), Dec. 3-4, 2002, Orlando, FL, 5 pages; http://citeseer.ist.psu.edu/viewdoc/summary?doi=10.1.1.19.8921.
Trevor Darrell, "A Real-Time Virtual Mirror Display," 1 page, Sep. 9, 1998; http://people.csail.mit.edu/trevor/papers/1998-021/node6.html.
Tsapatsoulis, N., et al., "Face Detection for Multimedia Applications," Proceedings of the ICIP Sep. 10-13, 2000, Vancouver, BC, Canada; vol. 2, pp. 247-250.
Tsapatsoulis, N., et al., "Face Detection in Color Images and Video Sequences," 10th Mediterranean Electrotechnical Conference (MELECON), May 29-31, 2000; vol. 2; pp. 498-502.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7-03/0004; 8 pages; http://www.hml.queensu.ca/papers/vertegaalchi0403.pdf.
Wachs, J., et al., "A Real-time Hand Gesture System Based on Evolutionary Search," Vision, $3^{rd}$ Quarter 2006, vol. 22, No. 3, [originally published Dec. 1, 2005]; 18 pages; http://web.ics.purdue.edu/~jpwachs/papers/3q06vi.pdf.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/sO9-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.
Weinstein et al., "Emerging Technologies for Teleconferencing and Telepresence," Wainhouse Research, Sep. 2005 http://www.ivci.com/pdf/whitepaper-emerging-technologies-for-teleconferencing-and-telepresence.pdf.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings of International Conference on Image Processing (ICIP), Oct. 23-26, 1995, Washington, DC, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Wi-Fi Protected Setup, from Wikipedia, Sep. 2, 2010, 3 pages http://en.wikipedia.org/wiki/Wi-Fi_Protected_Setup.
Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.
Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

(56) References Cited

OTHER PUBLICATIONS

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Proceedings 10th Pacific Conference on Computer Graphics and Applications, Oct. 9-11, 2002, Beijing China; 10 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS 2006 10(3), pp. 377-394, May 1, 2006, Blackwell Publishing, Ltd.

Zhong, Ren, et al., "Integration of Mobile IP and MPLS," Network Working Group, Jul. 2000, 15 pages; http://tools.ietf.org/html/draft-zhong-mobile-ip-mpls-01.

PRC Aug. 3, 2012 SIPO First Office Action from Chinese Application No. 200980119121.5; 16 pages.

PRC Jan. 7, 2013 SIPO Second Office Action from Chinese Application Serial No. 200980105262.1.

PRC Apr. 3, 2013 SIPO Second Office Action from Chinese Application No. 200980119121.5; 16 pages.

PRC Jul. 9, 2013 SIPO Third Office Action from Chinese Application No. 200980119121.5; 15 pages.

PRC Aug. 28, 2013 SIPO First Office Action from Chinese Application No. 201080010988.X 7 pages.

PRC Nov. 26, 2013 SIPO First Office Action from Chinese Application No. 201080020670 5pgs.

PRC May 5, 2014 SIPO Second Office Action from Chinese Application No. 201080010988.x (English Translation Only).

PRC Nov. 15, 2014 SIPO Third Office Action from Chinese Application No. 201080010988.x.

PRC Sep. 3, 2014 SIPO First Office Action from Chinese Application No. 201180054805.

Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/OB22LFIS1NVyrOmR.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Feld, Brad, "Science Fact," Oblong Industries, Inc. Web Log, Nov. 13, 2008, 2 pages,http://oblong.com/article/084H-PKI5Tb9l4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

\* cited by examiner

SYSTEM AND METHOD FOR EXTENDING COMMUNICATIONS BETWEEN PARTICIPANTS IN A CONFERENCING ENVIRONMENT

RELATED APPLICATION

This Application is a continuation (and claims the benefit of priority under 35 U.S.C. §120) of U.S. application Ser. No. 12/475,075, filed May 29, 2009, entitled "SYSTEM AND METHOD FOR EXTENDING COMMUNICATIONS BETWEEN PARTICIPANTS IN A CONFERENCING ENVIRONMENT," Inventors Brian J. Baldino, et al. The disclosure of the prior application is considered part of (and is incorporated by reference in) the disclosure of this application.

TECHNICAL FIELD

This disclosure relates in general to the field of communications and, more particularly, to extending communications between participants in a conferencing environment.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. Some issues have arisen in video conferencing scenarios when one user seeks to exchange information during a video conference. Information distribution during a video conference presents a significant challenge to developers and designers, who attempt to offer a video conferencing solution that is realistic and that mimics a real-life meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving data associated with a local endpoint that is configured to participate in a video conference. The local endpoint can be configured to detect a signal generated by a local end user device and to relay the signal to a local manager element. The method also includes transmitting the signal over a network to a remote manager element at a remote location. In more specific embodiments, the method includes receiving an additional signal from the remote manager element, and determining a selected local endpoint to receive the additional signal from the remote manager element.

Figure 1:
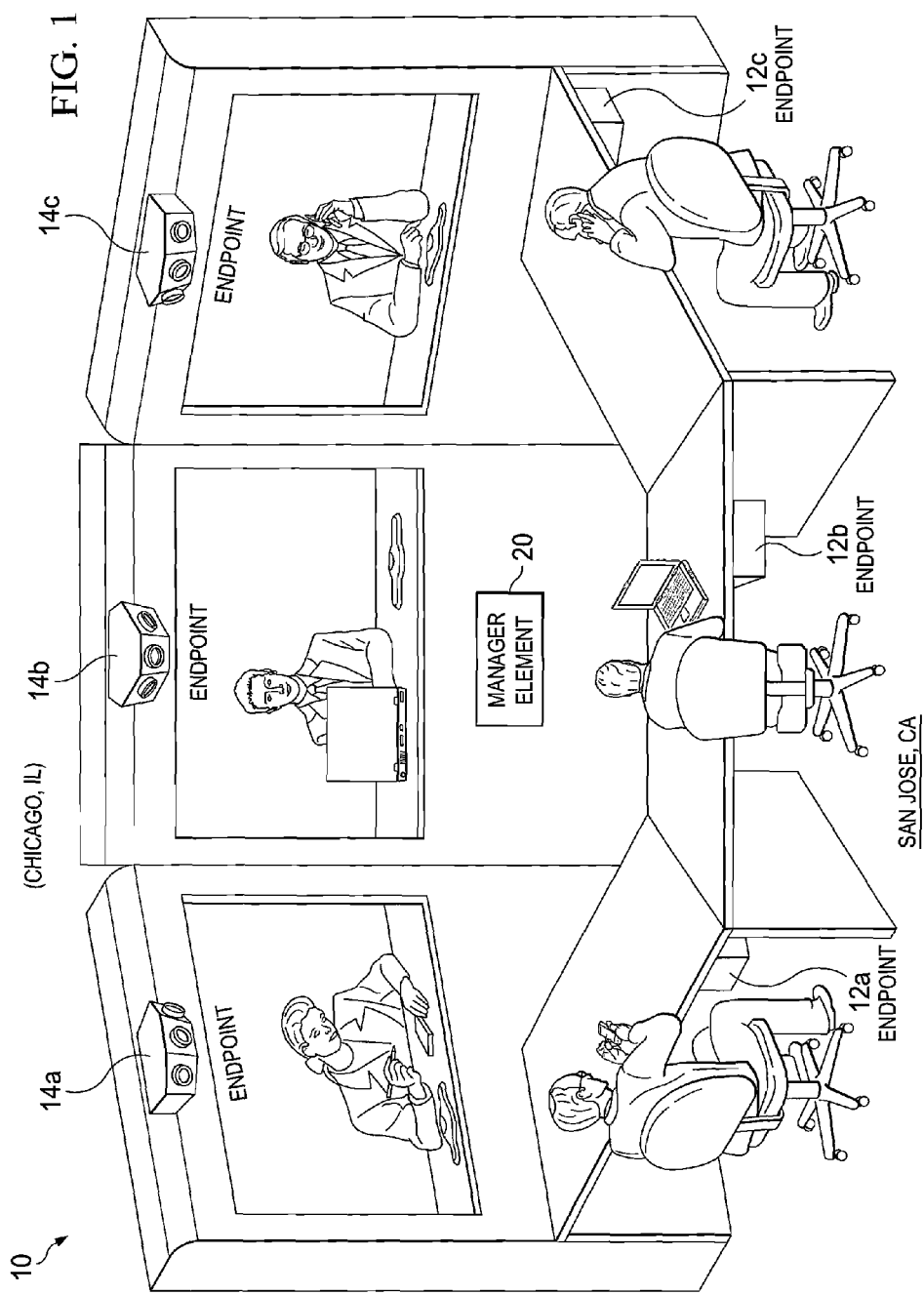
FIG. 1 is a simplified schematic diagram of a communication system for extending communications in a conferencing environment in accordance with one embodiment.

FIG. 1 is a simplified schematic diagram illustrating a communication system 10 for conducting a video conference in accordance with one example embodiment. FIG. 1 includes multiple endpoints, 12a-f associated with various participants of the video conference. In this example, endpoints 12a-c are located in San Jose, Calif., whereas endpoints 12d-f are located in Chicago, Ill. Endpoint 12a is operating a personal digital assistant (PDA), endpoint 12b is operating a laptop, and endpoint 12c is operating a cellular telephone in this example. Their counterparties in Chicago are operating similar devices, as is depicted and as used herein in this Specification, all such devices are referred to as 'end user devices.'

FIG. 1 includes multiple endpoints 12a-f being coupled to a manager element 20. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In this example, each endpoint 12a-f is fitted discreetly along a desk and is proximate to its associated participant. Such endpoints could be provided in any other suitable location, as FIG. 1 only offers one of a multitude of possible implementations for the concepts presented herein. In one example implementation, the endpoints are video conferencing endpoints, which can assist in receiving and communicating video and audio data. Other types of endpoints are certainly within the broad scope of the outlined concept and some of these example endpoints are further described below. Each endpoint 12a-f is configured to interface with a respective manager element, which helps to coordinate and to process information being transmitted by the participants. Details relating to each endpoint's possible internal components are provided below with reference to FIG. 2. Details relating to manager element 20 and its potential operations are provided below with reference to FIG. 3.

As illustrated in FIG. 1, a number of cameras 14a-14c and screens are provided for the conference. These screens render images to be seen by the endpoints. Note that as used herein in this Specification, the term 'screen' is meant to connote any element that is capable of rendering an image during a video conference. This would necessarily be inclusive of any panel, plasma element, television, monitor, display, or any other suitable element that is capable of such rendering.

Note that before turning to the example flows and infrastructure of example embodiments of the present disclosure, a brief overview of the video conferencing architecture is provided for the audience. The components of the video conferencing architecture of FIG. 1 use technologies in conjunction with specialized applications and hardware to create a solution that can leverage the network. This video conferencing architecture can use the standard IP technology deployed in corporations and can run on an integrated voice, video, and data network. The system can also support high quality, real-time voice, and video communications with branch offices using broadband connections. It can further offer capabilities for ensuring quality of service (QoS), security, reliability, and high availability for high-bandwidth applications such as video. Power and Ethernet connections for all participants can be provided. Participants can use their laptops to access data for the meeting, join a meeting place protocol or a Web session, or stay connected to other applications throughout the meeting.

Video conference technology seeks to create an in person experience for its participants. There are various modes of technological communications, which may be used in conjunction with a video conference. Typically, during a video conference participants may seek to exchange data using various communication formats. E-mail is a good example of one communication format that can be used to exchange information during a video conference. However, aside from this blunt e-mail tool, there are no platforms for distributing information during a video conference in an elegant manner.

Certain instant messaging (IM) clients can use various technologies (such as Bonjour), which can act as a discovery protocol. For example, a laptop being used by end user #1 may discover a laptop being used by end user #2. Once discovered, each laptop would populate the other user's laptop, for example, through a Buddy List. Device discovery and interoperability protocols such as universal plug and play (uPnP), Bonjour, and various Bluetooth implementations are ubiquitous, as the demand for proximity-based device interaction grows. As video conferencing scenarios (which includes on-line meeting protocols) become more prevalent, many of these communication protocols and applications (e.g., Bluetooth, infrared, etc.) falter. Most participant interaction is limited to the subnet to which the devices are connected, or limited to the local proximity of the device itself. Thus, during a video conferencing scenario (e.g., a TelePresence meeting), where participants are distributed remotely at various different sites, endpoints could not discover instant messaging clients of their counterparties (or discover other presence-enabled applications). Similarly, participants could not intuitively send documents without having to resort to conventional emailing protocols. Along the same rationale, participants could not pan or share laptop screens with other participants via a virtual network computing (VNC), or through screen sharing (inclusive of applications such as Apple's Screen Sharing software).

Example embodiments presented herein can expand the reach of these identified discovery and interoperability protocols beyond the immediate physical proximity range to which end users have grown accustomed. Communication devices in a 'virtual proximity' can readily interact with each other. This would be done dynamically, as judged with respect to the connection state of users at each endpoint in a conference. For example, if a participant were to disconnect from a call, the participant is no longer in the virtual proximity of the other devices.

Note that there are a number of protocols and device interactions that can be extended. For purposes of teaching, a few common interaction methods are detailed hereafter and these methods can also include strategies for carrying this proximity data between the participants in a video conference. Turning to a first example involving IP connectivity via Ethernet and wireless applications, users could plug in directly to Ethernet ports, which may be resident on (or proximate to) a video-conferencing table. Alternatively, users could connect to an access point dedicated to the respective endpoint. These access methods could also provide for any needed network connectivity to their physical location. This would extend IP-based protocols that rely on the devices being on the same subnet. In one sense, example embodiments presented herein can create a dynamic virtual local area network (VLAN) consisting of the users in the same virtual conference. An alternative (or supplementing solution) is to have an interface where participants of a conference register their devices with a centralized authority that would filter (e.g., based on MAC/IP addresses) to allow users on each endpoint to interact with each other's devices.

Turning to a different example involving non-IP based discoverability and interoperability solutions (e.g., Bluetooth, infrared, etc.), these proximity-based communication methods are common among mobile wireless devices and laptops. In countries outside the U.S., infrared transmission between cell phones is a common way of exchanging contact information, calendars, etc. Infrared and Bluetooth repeaters could be incorporated into each endpoint to facilitate these protocols being extended, as detailed below. These devices generally operate on 1-1 communications paradigm, rather than 1-n, and therefore system 10 can optionally leverage manager element 20 to relay proximity signals between participants directly talking to each other. For example, once interaction takes place during the video conference, manager element 20 could either sustain their interaction after another participant switches in replacing them, or lock them together for signaling purposes until the interaction is complete.

Before turning to some of the operations of this architecture, a brief discussion is provided about some of the infrastructure of FIG. 1. Endpoint 12a is a client or customer wishing to participate in a video conference in communication system 10. The term 'endpoint' may be inclusive of devices used to initiate a communication, such as a switch, a console, a proprietary endpoint, a telephone, a bridge, a computer, a personal digital assistant (PDA), a laptop or electronic notebook, or any other device, component, element, or object capable of initiating voice, audio, or data exchanges within communication system 10. The term 'end user device' may be inclusive of devices used to initiate a communication, such as an IP phone, an I-phone, a telephone, a cellular telephone, a computer, a PDA, a laptop or electronic notebook, or any other device, component, element, or object capable of initiating voice, audio, or data exchanges within communication system 10.

Endpoint 12a may also be inclusive of a suitable interface to the human user, such as a microphone, a display, or a keyboard or other terminal equipment. Endpoint 12a may also include any device that seeks to initiate a communication on behalf of another entity or element, such as a program, a database, or any other component, device, element, or object capable of initiating a voice or a data exchange within communication system 10. Data, as used herein in this document, refers to any type of video, numeric, voice, or script data, or any type of source or object code, or any other suitable information in any appropriate format that may be communicated from one point to another. Additional details relating to the endpoints are provided below with reference to FIG. 2.

Manager element 20 is a switch in one example implementation that executes some of the video conferencing activities, as explained herein. In other scenarios, manager element 20 could be virtually any network element, a proprietary device, or anything that is capable of facilitating an exchange or coordination of video and/or audio data. As used herein in this Specification, the term 'manager element' is meant to encompass switches, servers, routers, gateways, bridges, loadbalancers, or any other suitable device, network appliance, component, element, or object operable to exchange or process information in a video conferencing environment. Moreover, manager element 20 may include any suitable hardware, software, components, modules, interfaces, or objects that facilitate the operations thereof. This may be inclusive of appropriate algorithms and communication protocols that allow for the effective delivery and coordination of data or information.

Manager element 20 can be equipped with appropriate software to execute the described extension operations in an example embodiment of the present disclosure. Memory elements and processors (which facilitate these outlined operations) may be included in this device or be provided externally to this device, or consolidated in any suitable fashion. The processors can readily execute code (software) for effectuating the activities described. Manager element 20 is a multipoint device that can establish a conversation or a call between one or more end users, which may be located in various other sites and locations. Manager element 20 can also coordinate and process various policies involving endpoints 12. Manager element 20 includes a switching component that determines which signals are to be routed to individual endpoints 12. Manager element 20 can also determine how individual end users are seen by others involved in the video conference. Furthermore, manager element 20 can control the timing and coordination of this activity. Manager element 20 can also include a media layer that can copy information or data, which can be subsequently retransmitted or simply forwarded along to one or more endpoints 12. Additional details related to manager element 20 are provided below with reference to FIG. 3.

The memory elements identified above can store information to be referenced by manager element 20. As used herein in this document, the term 'memory element' is inclusive of any suitable database or storage medium (provided in any appropriate format) that is capable of maintaining information pertinent to the coordination and/or processing operations of manager element 20. For example, the memory elements may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

As identified earlier, in one example implementation, manager element 20 includes software to achieve the extension operations, as outlined herein in this document. Additionally, endpoint 12a may include some software (e.g., reciprocating software or software that assists in the listening for signals, repeating signals, etc.) to help coordinate the extension activities explained herein. In other embodiments, this processing and/or coordination feature may be provided external to these devices (manager element 20 and endpoint 12a) or included in some other device to achieve this intended functionality. Alternatively, both manager element 20 and the peer endpoints include this software (or reciprocating software) that can coordinate in order to achieve the operations, as outlined herein.

Turning back now to the operational aspects of example embodiments, example scenarios presented herein do not require a central authority for registering various devices as the end users participate in a video conference. Instead, when a first end user dials into a video conference, one or more endpoints are configured to have certain types of communication methods supported (Bluetooth, infrared, Wi-Fi, RFID, etc.). In essence, the endpoints can take what is available in their respective area and extend that to a remote endpoint's proximate area. Note that a line of sight is not required in order to transmit various signals, as radiofrequency identification technology can certainly operate in this manner. Additionally, other technologies such as Wi-Fi would not require line of sight for data transmissions and, thus, can readily be extended to remote participants as outlined herein.

The operation of extending signals is somewhat dynamic, as it can readily allow protocols and devices to be systematically discovered and then pushed to remote endpoints: simulating a conventional in person meeting. Note that as used herein in this Specification, the term 'signal' is meant to connote any type of data (voice, image, video, control, script, packets, etc.) that could be sent between participants, were they to be located nearby. This would not only include participants exchanging signals when positioned next to each other, but also be inclusive of scenarios in which participants are in the same structure (e.g., a building, a street, a floor, etc.), or scenarios in which there is some type of connection (wireless or wired) that could be achieved between two participants.

The dynamic capabilities of system 10 can be more ad hoc, where preregistration type activities can be avoided. Note that such a system can also offer a cross protocol model because various signals can be packetized (for example, in a similar manner in which Ethernet often travels). For example, from the perspective of a first endpoint, the transmission could be from Bluetooth to Ethernet, and once the signal traverses the network, it could end up being converted from Ethernet to infrared. Such transformations would be dictated by the technologies being employed by end users of the video conference and are certainly within the broad teachings of the concepts presented herein.

Consider an example scenario that is illustrative. If a laptop being operated by a first end user has a Bluetooth capability, a simple file exchange could be initiated by the first end user such that it is received (via manager element 20) at the other endpoint, which may have received the file through its own laptop. Note that this would have occurred naturally, as a result of Bluetooth technology, were the two participants face-to-face during an in-person meeting scenario.

Bluetooth and infrared typically work in a broadcast paradigm, where if an end user of such technology seeks to employ either of these technologies, the signal would be broadcasted to virtually everyone in the vicinity. In this sense, the technologies are area-based and somewhat indiscriminate in terms of potential recipients to receive an outgoing signal. This exportation of point-to-point communications can be modified slightly in example embodiments presented herein. For example, the distribution of signals emanating from the endpoints is somewhat controlled. In one example, the distribution is only sent to sites that are currently being viewed by the endpoint in the video conference. In another example implementation involving TelePresence technology, an outgoing signal would only be sent to the participants that are being seen by the end user, whose device is currently attempting a signal transmission. In other examples, the transmitting end user can configure the system to only send data to selected participants. This election could be the result of a registration for the video conference, or segmented by employer (only employees from the ABC company may receive signals being transmitted by an endpoint), or segmented by some type of security clearance, or selected via any other suitable parameters, which are configurable.

In terms of advantages, communication system 10 offers a more realistic experience of a meeting between multiple participants. This is achieved by intelligently and rapidly disseminating signals between endpoints. This can better simulate the experience of a conversation that occurs in an actual conference room. By intelligently provisioning communication exchanges, the video conference more closely mirrors a real-life meeting scenario, where the interaction between devices would be autonomous and convenient. The extension activities presented herein can occur with minimal or no end-user involvement, as the system can perform this intelligent switching autonomously.

Figure 2:
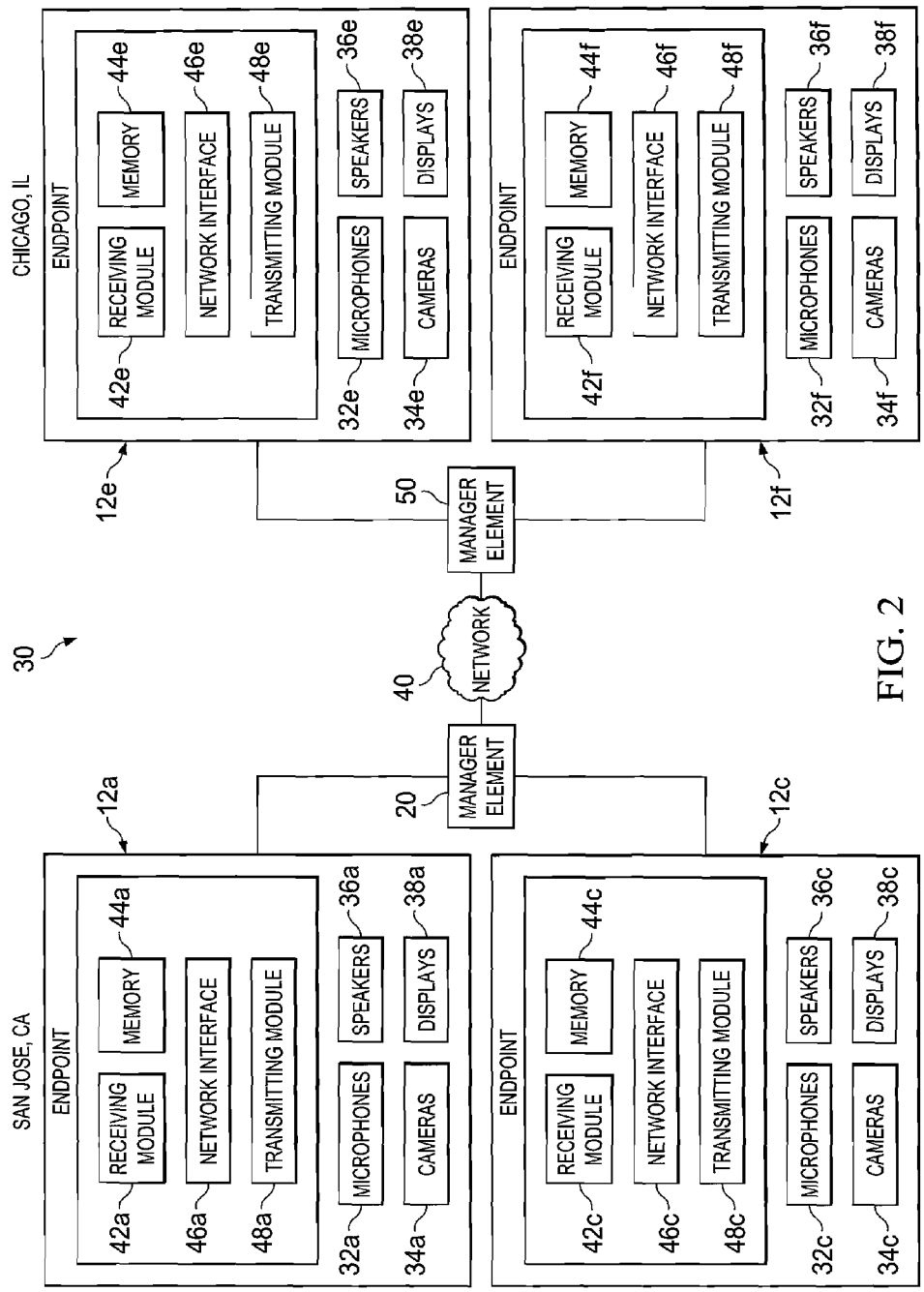
FIG. 2 is a simplified block diagram of a communication system for extending communications in a conferencing environment in accordance with one embodiment.

FIG. 2 is a simplified block diagram illustrating a number of example endpoints that may be used in conjunction with communication system 10. In this example, endpoints in San Jose are configured to interface with manager element 20, which is coupled to a network 40. Along similar rationales, endpoints in Chicago are configured to interface with manager element 50, which is similarly coupled to network 40. Each endpoint 12a-f may be similarly configured or designed in order to achieve example operations outlined herein. For purposes of simplification, endpoint 12a is described and its internal structure may be replicated in the other endpoints, as is illustrated in FIG. 2. Endpoint 12a includes a receiving module 42a, a transmitting module 48a, a memory 44a, a network interface 46a, one or more microphones 32a, one or more cameras 34a, one or more speakers 36a, and one or more displays 38a. Endpoint 12a may be configured to communicate with manager element 20, which is configured to facilitate network communications with network 40. Any one or more of these items may be consolidated or eliminated entirely, or varied considerably and those modifications may be made based on particular communication needs.

In one example, endpoint 12a includes receiving module 42a and transmitting module 48a for both receiving signals and for re-emitting signals respectively. For example, transmitting module 48a can transmit a received signal to its respective manger element 20, but it can also operate in the reverse direction by transmitting an incoming signal (from manager element 20) to its respective end user devices (or to other proximately based end user devices). Thus, transmitting module 48a can receive an incoming signal from manger element 20 and repeat it such that every device in a given room (or building, etc.) could receive this signal. Other examples would not involve such a broadcast, as transmitting module 48a can selectively propagate the incoming signal to specific end user devices (or specific participants of the video conference, etc.).

In one example implementation, each of the endpoints, indiscriminately receive or transmit signals being detected, such that the decision as to where to ultimately send the received information would rest with manager elements 20 and 50. In this sense, the endpoints are simply operating as a conduit, much like the way a camera would systematically pick up or otherwise detect images in a video conferencing room and, further, propagate those images along to a next destination. In other scenarios, each endpoint includes some intelligence and/or filtering mechanism for discerning which signals are to be received and transmitted.

Additionally, in one example implementation, manager elements 20 and 50 include a control module (shown and described with reference to FIG. 3) that dictates how to forward signals onto various participants in the video conference. As outlined above, one example includes only forwarding signals to participants being seen by the endpoint seeking the transmission. Manager elements 20 and 50 can be aware of (and potentially store) information about who is being seen by the participants of the video conference. Manager elements 20 and 50 can selectively distribute signals to various participants using any suitable criteria.

In another example implementation, manager elements 20 and 50 do not discern which of the participants in the video conference should receive the incoming signals. In this sense, manager elements 20 and 50 are operating in a first mode, which is akin to a broadcast arrangement. In another example, a group can be created in order to selectively direct signals to specific individuals. In other examples, a policy could be configured that dictated which participants should receive data transmissions.

For example, endpoint 12a can utilize its receiving module 42a to pick up various signals such as infrared signals or Wi-Fi signals. That data can be sent to manager element 20, which is configured to make a decision as to which endpoints should receive the signal. In this example, manager element 20 has determined that endpoint 12e is being seen by endpoint 12a and, therefore, attempts to send the signal to its counterparty manager element 50 for dissemination to endpoint 12e. Endpoint 12e receives this signal and utilizes its transmitting module 48e in order to repeat this signal at that location. The signal could then be picked up (or otherwise received) by devices being used by an end user at endpoint 12e (e.g., a laptop, a phone, etc.). In this sense, the endpoints and manager elements are cooperating in order to mimic the environment of San Jose in Chicago. In one sense, each endpoint can operate as a digital switch in replicating the information that it receives. Note that certain types of white lists and black lists can be provided in order to determine which types of information are permitted within a particular forum.

Network 40 represents a series of points or nodes of interconnected communication paths for receiving and transmitting packets of information that propagate through communication system 10. Network 40 offers a communicative interface between sites (and/or endpoints) and may be any LAN, WLAN, MAN, WAN, or any other appropriate architecture or system that facilitates communications in a network environment. Network 40 implements a TCP/IP communication language protocol in a particular embodiment of the present disclosure; however, network 40 may alternatively implement any other suitable communication protocol for transmitting and receiving data packets within communication system 10. Note also that network 40 can accommodate any number of ancillary activities, which can accompany the video conference. For example, this network connectivity can facilitate all informational exchanges (e.g., notes, virtual white boards, PowerPoint presentations, e-mailing, word processing applications, etc.).

Figure 3:
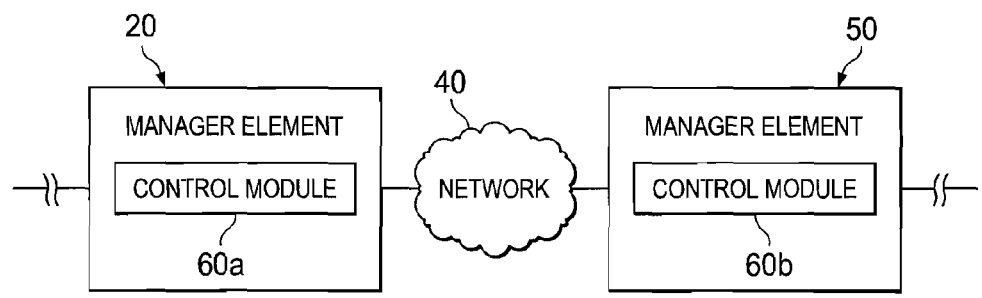
FIG. 3 is a simplified block diagram of an example configuration for manager elements in accordance with one embodiment.

FIG. 3 is a simplified block diagram of manager elements 20 and 50. Each manager element 20 and 50 may include a control module 60a, 60b respectively. In one example embodiment, manager elements 20 and 50 can employ a packetizing protocol in order to format, or otherwise transform, signals being sent or received via the endpoints. This can include satellite communications, Wi-Fi communications, TCP/IP communications, Ethernet, or any other protocol that can exist in cooperation with the endpoints.

In other example implementations, manager elements 20 and 50 can be used to join remote networks (for example, Wi-Fi points) in order to carry out similar operations. In one sense, the network for one group of end users is being shared with another group of end users, even though the two groups are not co-located. This extension concept can also include plugging in a cable (for example, an Ethernet cable) at a local interface to recreate an in-person meeting. Some of these operations could be provided in conjunction with existing discovery protocols, such as those provided by companies such as Apple (iChat), and other protocols in which discovery of existing devices occurs. In this sense, a virtual network is configured amongst one or more participants. In other scenarios, an ad hoc configuration can be implemented such that some central authority can operate as a proxy for signals moving between participants of the meeting, or of the video conference.

Example embodiments of manager element 20 and 50 can enable discoverability and interoperability of devices [which are traditionally limited by physical proximity] to interact across dispersed virtual conferencing participants. This can further enhance the notion of "being in the same room" and, further, apply to any mobile device that uses discoverability, to any computer that leverages discoverability over IP, or to any data transmission that is proximity-based. Security can be a consideration in the sharing and discoverability protocols. The security concern could be solved in a number of ways (e.g., using an access control list (ACL), or based on users registering all allowed devices with a central manager (even if not managed by the central manager), or by a MAC address, or by the use of pin numbers when connecting, or by various other mechanisms of offering security).

In operation of another example scenario involving an implementation of manager element 20, a side-band data stream can flow between the endpoints and carry a packetized form of the communication. This stream can be routed to target endpoint(s) by manager element 20, which has knowledge of which endpoint(s) are present on an endpoint's screen(s) at a given time. A service can run on manager element 20 bound to respective ports for each supported device and can act as a proxy. When connecting to manager element 20, each endpoint can leverage the existing multiplex negotiation scheme, which allows an endpoint to communicate the streams it is capable of sending and receiving, to signal this extra ability. An extra bit in this multiplexing can be allocated to denote the ability to send and receive these side-band streams, which will allow manager element 20 to set up the extra ports to send and to receive side-band data. When manager element 20 receives data from an endpoint on the side-band stream, it will determine who is currently being shown to that endpoint, and then forward the stream to only those endpoints for reception.

Once this connection is established, it can persist, meaning that if the recipient switches out, the connection will not necessarily be torn down in example embodiments. After data transmission from the sender has terminated, a timeout can determine when the connection is torn down. Although the scheme can forward the data to potential unintended recipients, this is akin to the current implementations of technologies such as infrared or Bluetooth, where the data is available to anyone within range, intended or not. In a point-to-point scenario, the scheme is similar, where the same multiplex negotiation is used to signal the ability. In this example, when data is sent, it is forwarded almost immediately to the opposite side because there is no longer a need for a middle entity to determine who is currently being seen.

In example of a first use case involving a mobile device interaction, mobile devices can display profiles or advertisements of the people in the nearby area. In a similar vein, an end user could venture to a mall and have coupons pushed to the mobile device when walking by a storefront. Another instance could involve being at work and wanting to display what is on a mobile phone screen on to a larger display nearby. Using a simple discover/extension protocol, the small screen from the mobile device can be projected to the larger display. These uses require device discoverability and data communication on a proximity basis. Example embodiments presented herein can achieve these same interactions, but over great expanses such that one group in Chicago is transmitting signals, while a second group in San Jose is on the receiving end of the signaling.

In a second use case, a meeting could be occurring between two endpoints in Japan, where it is common to share phone contact cards via beaming them over infrared. Example embodiments of the concept presented can employ an infrared transceiver on both endpoints of a conference (along with potentially a mechanism of digitizing the signals) to replicate the signal at other endpoints (possibly on a selectively switched basis) to allow for infrared communication between endpoints.

In a third use case, if end user Bob in San Jose wishes to let end user Joe in Chicago control his laptop user interface, Bob should identify his internet protocol (IP) address, send the address to Joe, and have Joe enter the IP address to complete the connection through some type of coupling software. However, if they were on the same local network, applications such as VNC or Apple's OSX 10.5 would show the users with VNC connections on the same subnet. Using example implementations presented herein, Joe simply has to click on Bob's name and connect to his machine. This has been enabled through a discovery operation in conjunction with the extension activities outlined herein.

In one sense, these particular participants are operating in a scenario similar to a VPN configuration. For example, once both Bob and Joe have plugged their respective cables into some type of receptacle (for example, an Ethernet port), then these individuals would be able to exchange signals or data, as outlined herein. Joe's device could certainly discover Bob's laptop and vice versa.

Consider another example implementation, where two business entities are involved in a potential conference call. In this example, Joe is an employee of Kmart and Bob is an employee of Cisco Systems, Inc. Bob has a file that he would like to share with Joe, however, that file is resident within the Cisco network and, therefore, Joe is precluded from seeing it. To solve this issue, example embodiments of the present disclosure can allow Joe to latch onto the network being used by Bob. (For purposes of simplification, security mechanisms or authentication type procedures are not discussed in the context of this scenario.) If the signals being received by Bob can be transferred over to Joe, effectively Joe would latch onto Bob's network and be able to see this file. This is somewhat similar to logging into a VPN client in order to share a network and, thereby, share information. Once this connectivity is established, then all of the activities outlined herein can be accomplished. For example, Bob could set up a shared folder, or a shared screen, or an FTP file (etc.) and effectively eliminate all the firewalls, IP addresses, and the considerable overhead that would otherwise be present in such a scenario.

In a fourth use case, chat programs can use such an extension protocol. For example, Apple's iChat leverages the Bonjour discoverability protocol for many uses, such as iTunes and iChat. Shared media and conference-specific chat communications could be useful in many environments. Using the teachings outlined herein, the discoverability and extension protocols may be used to create an in-person meeting experience, even though participants are separated by a considerable distance.

In a fifth use case, unified communications could similarly use the extension model outlined herein. Such activities could further enhance presence information and device interoperability as IP Phone solutions become more intelligent and more advanced in capabilities. Presentation streams from a video conference platform (e.g., TelePresence) could be sent to IP Phones that are capable of displaying the media and so forth. If a user is in a rich media conference (WebEx, MeetingPlace, etc.), they could switch between devices from which the media is streaming, or add-in other participants who join the end user in their proximity.

Figure 4:
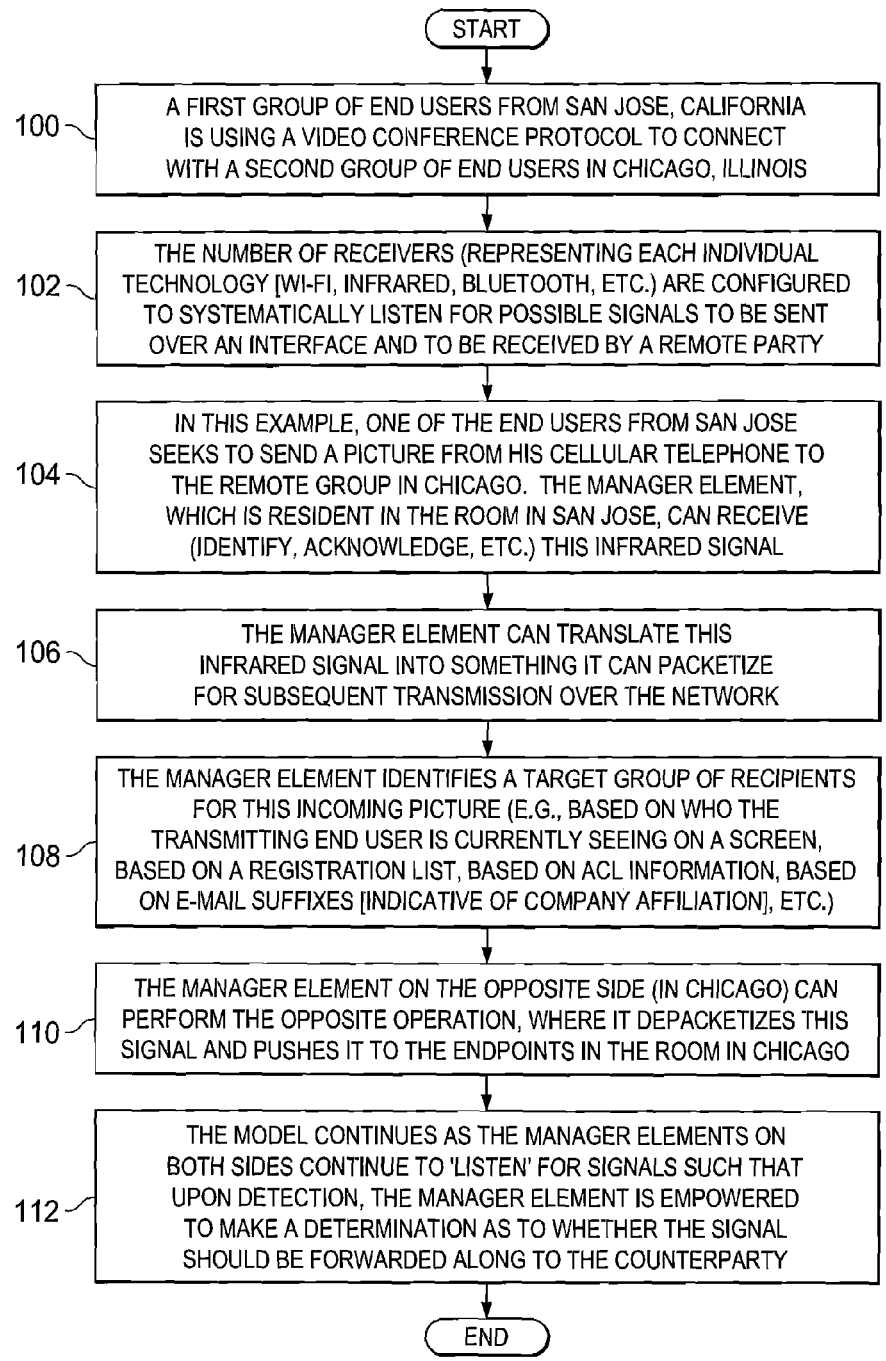
FIG. 4 is a simplified flowchart illustrating a series of example steps associated with the communication system.

Turning to an operational perspective of the present disclosure, FIG. 4 is a simplified flowchart illustrating one example flow associated with communication system 10. In this example flow, a first group of end users from San Jose, Calif. is using a video conference protocol to connect with a second group of end users in Chicago, Ill. This is depicted by step 100. The participants of this video conference can be somewhat oblivious to the data transmissions occurring during the call. The number of receivers (representing each individual technology [Wi-Fi, infrared, Bluetooth, etc.]) are configured to systematically detect possible signals to be sent over an interface and to be received by a remote party. This is depicted by step 102. As used herein in this Specification, and in regards to the activities associated with the endpoints, any act of listening, learning of, identifying, becoming aware of, receiving, etc. is included within the term 'detect.'

In this example, one of the end users from San Jose seeks to send a picture from his cellular telephone to the remote group in Chicago. Manager element 20, which is resident in the room in San Jose, can receive (identify, acknowledge, etc.) this infrared signal being sent along by corresponding endpoints. This is depicted by step 104. Manager element 20 can translate this infrared signal into something it can packetize for subsequent transmission over the network, as shown by step 106.

At step 108, manager element 20 identifies a target group of recipients for this incoming picture (e.g., based on who the transmitting end user is currently seeing on a screen, based on a registration list, based on ACL information, based on e-mail suffixes [indicative of company affiliation], etc.). The manager element on the opposite side (in Chicago) can perform the opposite operation, where it depacketizes this signal and pushes it to the endpoints in the room in Chicago. This is depicted by step 110. The endpoints can simply act as a repeater and replicate the signal such that they can be received at the remote location by end user devices at the remote site. In this sense, the manager element and endpoints in Chicago operate as a repeater in simply emitting the received signal to various participants at the remote site. This model continues as the manager elements on both sides continue to 'listen' for signals such that upon detection, the manager element is empowered to make a determination as to whether the signal should be forwarded along to counterparties. This is depicted by step 112.

Note that various technologies are proximity-based such that any entity within a certain distance could receive the signal in Chicago. In a general sense, the environment in San Jose is effectively being replicated in Chicago and this replication offers a video conference environment more similar to an in-person meeting in which end user devices could readily exchange such signals.

The transport of the signals between Chicago and San Jose can be coordinated using various strategies. For example, one piece of this concept entails detecting incoming signals and sending signals to the endpoints. Manager element 20 can detect a data stream and identify for whom it is intended (for example, through some control list, or through an identification of the participants being seen by the transmitting endpoint end user, etc.). In one sense, example embodiments presented herein can extend non-IP protocols (using IP) to different scenarios and environments in which they currently do not reside. Some of these non-IP protocols include Wi-Fi, infrared, Bluetooth, and include any other format that could be used in conjunction with IP, as outlined herein.

The functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein, and/or the memory element can store software, logic, code, or processor instructions that are executed to carry out the activities described in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of endpoints, as well as more complicated/sophisticated arrangements and configurations. Accordingly, the examples provided should not limit the scope or inhibit the broad teachings of communication system 10 as potentially applied to a myriad of other architectures.

It is also important to note that the steps discussed with reference to FIGS. 1-4 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in video conferencing environments or arrangements, the present disclosure may be used in any communications environment that could benefit from such technology. Virtually any configuration that seeks to intelligently provision a set of signals could enjoy the benefits of the present disclosure. Moreover, the architecture can be implemented in any system providing proximity-based signals for one or more endpoints. In addition, although some of the previous examples have involved specific terms relating to the TelePresence platform, the idea/scheme is portable to a much broader domain: whether it is other video conferencing products, smart telephony devices, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112a as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving data associated with a local endpoint that is configured to participate in a video conference, the local endpoint configured to:
        detect a signal generated by a local end user device; and
        relay the signal to a local manager element;
    determining by the local manager element whether translation of the signal is necessary and if so, translating the signal;
    determining by the local manager element a remote endpoint to receive the signal;
    transmitting the signal over a network to the remote endpoint to receive the signal via a remote manager element at a remote location;
    receiving an additional signal from the remote manager element; and
    determining a selected local endpoint to receive the additional signal from the remote manager element;
    wherein the determining a selected local endpoint includes using at least one of Internet protocol (IP) address information and imaging data from the video conference to identify the selected local endpoint to receive the additional signal from the remote manager element, and
    wherein the determining a remote endpoint includes using an access control list to identify the remote endpoint to receive the signal via the remote manager element.

2. The method of claim 1, further comprising packetizing the signal before transmitting the signal to the remote manager element.

3. The method of claim 1, wherein the signal is generated by the local end user device using a communications protocol selected from a group of communications protocols consisting of a Wi-Fi protocol, an infrared protocol, a Bluetooth protocol, and a radio frequency identification ("RFID") protocol.

4. An apparatus, comprising:
    a local manager element configured to:
        receive data associated with a local endpoint operable to:
            participate in a video conference,
            detect a signal generated by a local end user device, and
            relay the signal to the local manager element, wherein the local manager element is further configured to:
                receive the signal from the local endpoint;
                determine by the local manager element whether translation of the signal is necessary and if so, translating the signal;
                determine by the local manager element a remote endpoint to receive the signal;
                transmit the signal over a network to the remote endpoint to receive the signal via a remote manager element at a remote location;
                receive an additional signal from the remote manager element; and
    a control module configured to determine a selected local endpoint to receive the additional signal from the remote manager element using at least one of Internet protocol (IP) address information and imaging data from the video conference to identify the selected local endpoint to receive the additional signal from the remote manager element, wherein the control module is further configured to use an access control list for determining the remote endpoint to receive the signal via the remote manager element.

5. The apparatus of claim 4, wherein the local manager is further configured to packetize the signal before transmitting the signal to the remote manager element.

6. The apparatus of claim 4, wherein the signal is generated by the local end user device using a communications protocol selected from a group of communications protocols consisting of a Wi-Fi protocol, an infrared protocol, a Bluetooth protocol, and a radio frequency identification ("RFID") protocol.

7. One or more non-transitory tangible media that includes code for execution and when executed by a processor operable to perform operations comprising:
    receive data associated with a local endpoint configured to participate in a video conference, the local endpoint further configured to detect a signal generated by a local end user device and to relay the signal to a local manager element;
    determine by the local manager element whether translation of the signal is necessary and if so, translating the signal;
    determine by the local manager element a remote endpoint to receive the signal;
    transmit the signal over a network to the remote endpoint to receive the signal via a remote manager element at a remote location;
    receive an additional signal from the remote manager element; and
    determine a selected local endpoint to receive the additional signal from the remote manager element;
    wherein the determining a selected local endpoint includes using at least one of Internet protocol (IP) address information and imaging data from the video conference to identify the selected local endpoint to receive the additional signal from the remote manager element, and
    wherein the determining a remote endpoint includes using an access control list to identify the remote endpoint to receive the signal via the remote manager element.

8. The media of claim 7, wherein the operations further comprise packetizing the signal before transmitting the signal to the remote manager element.

9. The media of claim 7, wherein the signal is generated by the local end user device using a communications protocol selected from a group of communications protocols consisting of a Wi-Fi protocol, an infrared protocol, a Bluetooth protocol, and a radio frequency identification ("RFID") protocol.

10. A system, comprising:
    means for receiving data associated with a local endpoint that is configured to participate in a video conference, the local endpoint configured to detect a signal generated by a local end user device and to relay the signal to a local manager element;
    means for determining by the local manager element whether translation of the signal is necessary and if so, translating the signal;
    means for determining by the local manager element a remote endpoint to receive the signal;
    means for transmitting the signal over a network to the remote endpoint to receive the signal via a remote manager element at a remote location;
    means for receiving an additional signal from the remote manager element; and
    means for determining a selected local endpoint to receive the additional signal from the remote manager element;
    wherein the determining a selected local endpoint includes using at least one of Internet protocol (IP) address information and imaging data from the video conference to identify the selected local endpoint to receive the additional signal from the remote manager element, and
    wherein the means for determining a remote endpoint uses an access control list to identify the remote endpoint to receive the signal via the remote manager element.

11. The system of claim 10, further comprising means for packetizing the signal before transmitting the signal to the remote manager element.

12. The system of claim 10, wherein the signal is generated by the local end user device using a communications protocol selected from a group of communications protocols consisting of a Wi-Fi protocol, an infrared protocol, a Bluetooth protocol, and a radio frequency identification ("RFID") protocol.

* * * * *